United States Patent [19]
Ring et al.

[11] Patent Number: 5,754,184
[45] Date of Patent: May 19, 1998

[54] DIGITAL COLOR SYSTEM AND METHOD WHICH PROVIDES A VISUAL MATCH ACROSS DIFFERENT INPUT AND OUTPUT VIEWING CONDITIONS

[75] Inventors: Stuart Frederick Ring; Edward Joseph Giorgianni, both of Rochester, N.Y.

[73] Assignee: Eastman Kodak Company, Rochester, N.Y.

[21] Appl. No.: 2,497

[22] Filed: Jan. 6, 1993

[51] Int. Cl.$^6$ .................................................. G06T 11/00
[52] U.S. Cl. .................................................. 345/431
[58] Field of Search .................... 395/109, 129–133, 395/155, 161; 358/164, 298, 302, 443, 456, 501, 505, 506, 518–521, 523, 530, 531, 535, 537; 345/154, 200, 431; 364/526, 723; 355/38; 356/421; 382/54; 346/157

[56] References Cited

U.S. PATENT DOCUMENTS

| | | | |
|---|---|---|---|
| 3,893,166 | 7/1975 | Pugsley | 358/523 |
| 4,037,249 | 7/1977 | Pugsley | 358/505 |
| 4,060,829 | 11/1977 | Sakamoto | 358/523 |
| 4,346,402 | 8/1982 | Pugsley | 358/523 |
| 4,409,614 | 10/1983 | Eichler et al. | 358/530 |
| 4,488,245 | 12/1984 | Dalke et al. | 364/526 |
| 4,500,919 | 2/1985 | Schreiber | 358/518 |
| 4,523,852 | 6/1985 | Bauer | 356/421 |
| 4,626,901 | 12/1986 | Tanioka | 358/535 |
| 4,679,074 | 7/1987 | Sugiura et al. | 358/523 |
| 4,721,951 | 1/1988 | Holler | 345/154 |
| 4,751,535 | 6/1988 | Myers | 346/157 |
| 4,751,569 | 6/1988 | Clinton et al. | 358/501 |
| 4,755,810 | 7/1988 | Knierim | 345/200 |
| 4,812,902 | 3/1989 | Fuchsberger | 358/521 |
| 4,812,903 | 3/1989 | Wagensonner et al. | 358/521 |
| 4,825,296 | 4/1989 | Wagensonner et al. | 358/443 |
| 4,829,370 | 5/1989 | Mayne et al. | 358/537 |
| 4,837,722 | 6/1989 | Sara | 364/723 |

(List continued on next page.)

OTHER PUBLICATIONS

Tony Johnson and Ronnier Luo, *Optimising Colour Reproduction*, May 1991. Paper presented at 21st LARIGAI conference, Pittsburgh.

U.S. application No. 07/678,485, filed Apr. 1, 1991, David J. Statt.

White–Point Transformation and Color Data Interchange, R.R. Buckley, P.G. Roetling, Xerox Webster Research Center, Webster, NY, SID 92 Digest, 1992, pp. 560–563.

(List continued on next page.)

*Primary Examiner*—Almis R. Jankus
*Attorney, Agent, or Firm*—Peyton C. Watkins

[57] ABSTRACT

A color management system that converts or transforms color signals between device dependent color spaces and a device-independent space using reference image viewing conditions for the device-independent space. A device transform converts input color signals of an input image in an input space into device-independent color signals and a visual adaption transform converts the device-independent input color signals into device-independent signals that take into account the input viewing conditions, the reference viewing conditions and adaption characteristics of the human visual system to the standard viewing conditions. This provides intermediate signals which represent device independent corresponding colorimetric values that would be required to visually match the appearance of the input image, as seen in its input viewing conditions under the defined reference viewing conditions of the device independent space. The intermediate signals can then be transformed into output color signals for output, taking into account the reference and output viewing conditions, and the particular color reproduction and gamut capabilities of the output device. The color signals can then be converted into renderable output signals and rendered on the output device. A preview output image for a preview display device can be produced after taking into account the output device characteristics and viewing environment. Transforms for intent and editing, such as sharpening the image or cutting and pasting, can be performed in the intermediate device-independent space and previewed before rendering by the output device.

7 Claims, 6 Drawing Sheets

U.S. PATENT DOCUMENTS

| | | | |
|---|---|---|---|
| 4,839,721 | 6/1989 | Abdulwahab et al. | 358/518 |
| 4,839,722 | 6/1989 | Barry et al. | 358/523 |
| 4,841,360 | 6/1989 | Birgmeir | 358/521 |
| 4,875,032 | 10/1989 | McManus et al. | 345/154 |
| 4,888,636 | 12/1989 | Abe | 358/519 |
| 4,893,181 | 1/1990 | Yeomans | 358/531 |
| 4,924,323 | 5/1990 | Numakura et al. | 358/456 |
| 4,929,978 | 5/1990 | Kanamori et al. | 355/38 |
| 4,941,038 | 7/1990 | Walowit | 358/518 |
| 4,945,406 | 7/1990 | Cok | 358/506 |
| 4,956,718 | 9/1990 | Numakura et al. | 358/298 |
| 4,959,790 | 9/1990 | Morgan | 395/109 |
| 4,985,853 | 1/1991 | Taylor et al. | 358/80 X |
| 4,992,862 | 2/1991 | Gabor | 358/518 |
| 5,042,078 | 8/1991 | Oshikoshi et al. | 382/54 |
| 5,049,985 | 9/1991 | Outa | 358/530 |
| 5,057,913 | 10/1991 | Nagata et al. | 358/302 |
| 5,060,060 | 10/1991 | Udagawa et al. | 358/520 |
| 5,072,305 | 12/1991 | Numakura et al. | 358/298 |
| 5,073,818 | 12/1991 | Iida | 358/523 |
| 5,077,605 | 12/1991 | Ikeda et al. | 358/521 |
| 5,146,328 | 9/1992 | Yamasaki et al. | 358/164 |
| 5,148,288 | 9/1992 | Hannah | 358/298 |
| 5,208,911 | 5/1993 | Newman et al. | 395/131 |
| 5,276,779 | 1/1994 | Statt | 395/109 |
| 5,293,258 | 3/1994 | Dattilo | 358/518 |
| 5,309,257 | 5/1994 | Bonino et al. | 358/504 |
| 5,463,480 | 10/1995 | MacDonald et al. | 358/515 X |

OTHER PUBLICATIONS

White–Point Tranforms for Device–Independent Color Imaging, R.J. Motta, Hewlett–Packard Laboratories, Palo–Alto, CA, SID 92 Digest, 1992, pp. 555–559.

Color WYSIWYG: A Combination of Device Colorimetric Characterization and Appearance Modeling, R.S. Berns, Rochester Institute of Technology, Rochester, NY, SID 92 Digest, 1992, pp. 549–552.

Invited Address: Color Gamuts and the Ideal Printer, G.K. Starkweather, Apple Computer, Inc., Cupertino, CA, SID 92 Digest, 1992, pp. 564–567.

LeRoy E. DeMarsh and Edward J. Giorgianni, *Color Science For Imaging Systems*, pp. 44–52, Sep. 1989, Physics Today, New York, NY.

U.S. application No. 07/455,541, filed Dec. 22, 1989, Giorgianni et al.

DIGITAL COLOR SYSTEM AND METHOD WHICH PROVIDES A VISUAL MATCH ACROSS DIFFERENT INPUT AND OUTPUT VIEWING CONDITIONS

BACKGROUND OF THE INVENTION

1. Field of the Invention

The present invention is directed to color reproduction systems that accept color information from multiple sources with differing media and viewing environments for editing and layout, and then outputs the color information for reproduction on one or more output devices using different media and being viewed in differing viewing environments or for transfer to another system for additional processing and, more particularly, to systems that provide a visual match across different input media and viewing conditions and different output media and viewing conditions.

2. Description of the Related Art

Color information processing systems in which the color data passes through a digital intermediary allow improvements to be made using a single means which may be a digital computer. Alterations to color and tone scale of an image can be made in a convenient and adaptable way. Colors for corporate logos or presentation graphics can be made in a consistent fashion. Color information as images, graphics, or motion video can be combined and edited in a convenient fashion. Many of these types of improvements are known to those skilled in the art. For example, U.S. Pat. No. 4,500,919 entitled "COLOR REPRODUCTION SYSTEM", by W. F. Schreiber, discloses an image reproduction system of one type in which an electronic reader scans an original color image, which may be in the form of a transparency or print, and converts it to an electronic image. A computer and an interactive operator interface, including a video monitor, permit an operator to edit the image by means of displaying it on a monitor. When the operator has composed a desired image on the monitor, the computer causes the output writer device to make an inked output of the reproduced image. This system attempts to provide image consistency by trying to preserve a tristimulus match between the monitor and the hard copy input and output media. This system has the limitation that the viewing conditions for the monitor, original and hard copy output media must be carefully controlled to maintain the requirement of identical comparison viewing conditions as required by a tristimulus match. A tristimulus match can only maintain the true appearance under identical viewing conditions. This is a significant limitation requiring careful attention to the viewing environment.

Another approach, as suggested by R. S. Berns (SID 92 Digest page +549), is to transform all input color information into a common intermediate viewing condition independent color space using elaborate models of the human visual system to account for the viewing environment differences between inputs and outputs. These models have the drawback that it may take up to eight color variables (R. W. G. Hunt, Color Res. Appl. 16, 145–165 (1991)) to describe the appearance of color in a viewing condition independent manner. This approach has the further difficulty that it is very difficult to invert the viewing condition independent model to obtain equivalent output device colorant values for output viewing conditions from the viewing condition independent variables. For many applications the complexity of the Hunt approach is not necessary and a simpler approach is needed which focuses on the essentials of the requirements for a visual match.

SUMMARY OF THE INVENTION

It is an object of the present invention to provide a system that preserves the visual appearance of colors from a variety of input media or color specifications with differing viewing environments to a variety of output media or color specifications with differing viewing environments.

A further object of the present invention is to provide a method and means for forming an intermediate color data metric such that the appearance of colors from a variety of input media or color specifications with differing viewing environments is preserved when expressed using this intermediate color data metric.

Also an object of the present invention is to provide consistent color reproduction across a wide variety of output devices, media and viewing environments from an intermediate color data metric that preserves color appearance from a variety of inputs.

Another object of the present invention is to provide the capability for optimized color reproduction according to the intent of the application from an intermediate color data metric that preserves color appearance from a variety of inputs.

An object of the present invention is to provide methods and means for color data processing in the intermediate color data metric that preserves color appearance from a variety of inputs.

A further object of the present invention is to provide methods and means for previewing on a system monitor a simulation of selected color rendering choices and effects which takes into account the characteristics of the output device, media and viewing conditions.

The above objects can be attained by a color management system that converts or transforms color signals from an input device or input color specification into equivalent device-independent tristimulus values, relatable to human visual response, relative to the input viewing environments through an analytical model of the device response. These input device-independent tristimulus values then may be converted or transformed into an intermediate color data metric associated with a well-defined or reference viewing environment by the use of analytical models of human chromatic adaptation mechanisms that can account for the differences between the input viewing conditions and the viewing conditions associated with the intermediate color data metric. Once in the intermediate color data metric, color processing, such as color substitutions, editing, cut and paste from different inputs, etc. may be performed according to the needs of the application. When an output device, media and viewing environment have been determined, the color data in the intermediate color metric is first converted or transformed into equivalent tristimulus values for the output viewing environment again using analytical models of human chromatic adaptation mechanisms that can account for the differences between the output viewing conditions and the viewing conditions associated with the intermediate color metric associated with the well defined viewing environment. These tristimulus values are then converted into in-gamut tristimulus values according to the intent of the application and the color gamut of the selected output device. Finally the in-gamut tristimulus values are converted into device color values using an inverse analytical model of the device's color response. To preview on the system monitor the selected output rendering, the calculated output device colorant values can be transformed through an analytical model of the device's response into tristimulus values relative to the output viewing conditions. These in turn can be converted into intermediate color data metric values by a chromatic adaptation model which accounts for the differences between the output viewing conditions and the viewing conditions associated with the intermediate color data metric values by a chromatic adaptation model which accounts for the differences between the output viewing conditions and the viewing conditions associated with the intermediate color data metric. These values then can be transformed into equivalent tristimulus values for monitor viewing again by a chromatic adaptation model which accounts for the differences between the preview monitor viewing conditions and the viewing conditions associated with the intermediate color data metric. The equivalent monitor tristimulus values then may be transformed into monitor color signals through an inverse analytical model of the monitor response.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
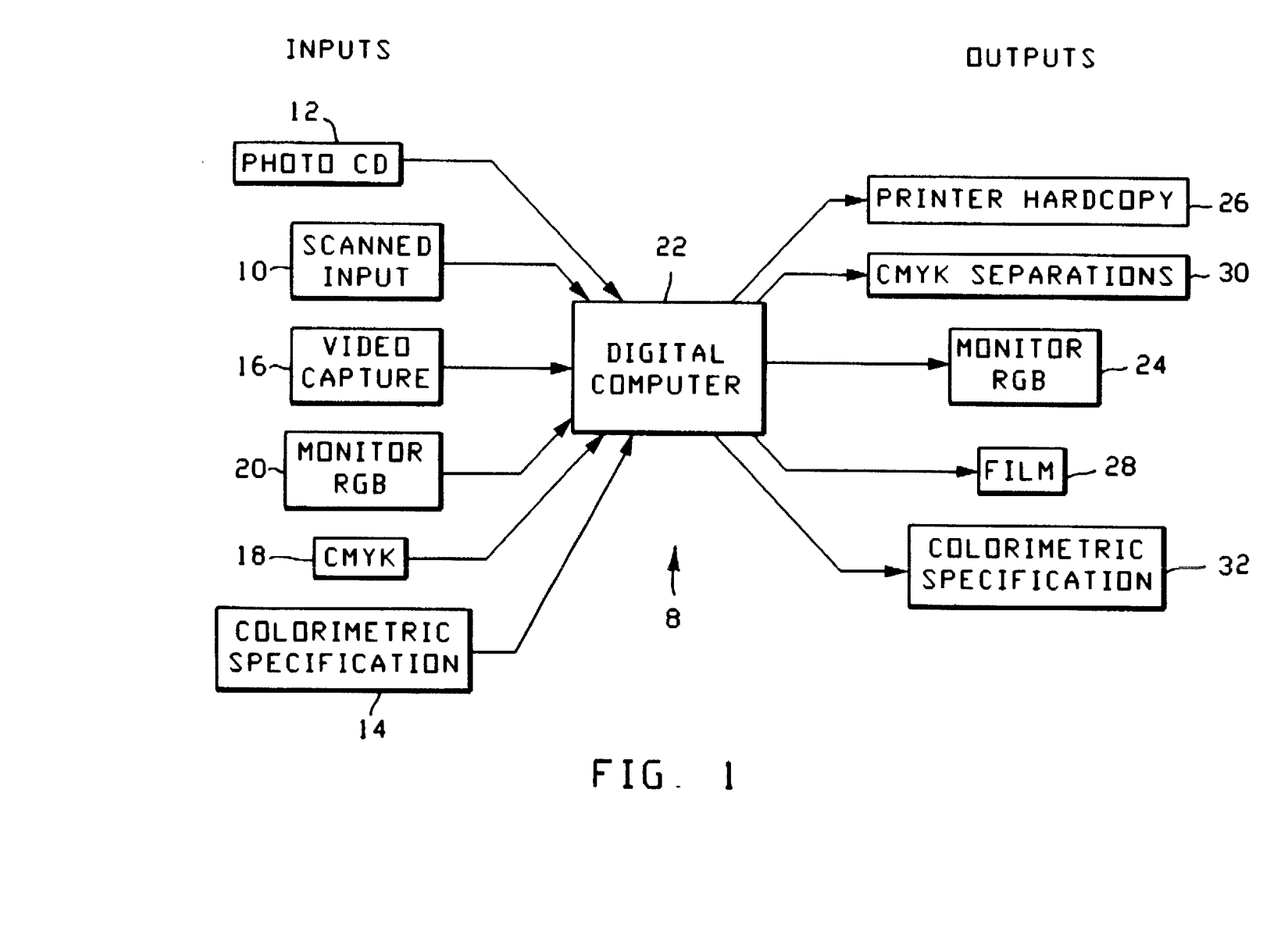
FIG. 1 illustrates a color reproduction system 8 in accordance with the present invention.

The present invention provides a color management system, as illustrated in FIG. 1, for receiving color data from a wide variety of color data input sources, manipulation or management of that data, and output of the color data to a wide variety of output devices. The viewing conditions of the inputs and outputs may vary according to the application. One problem sought to be solved by the present invention is to compensate or account for changes in the viewing environment which affect the state of the observers chromatic adaptation. To simplify the problem of accepting color data from m input sources and rendering color data on n outputs, as illustrated in FIG. 1, all with differing viewing conditions, the present invention converts all inputs into an intermediate color data metric 40 (FIG. 2) with an associated set of intermediate viewing condition assumptions. This is accomplished by providing mathematical models or transforms that relate color data source values to tristimulus values that are related to human visual response for the input media under the input viewing environment. These tristimulus signals are then converted by means of a chromatic adaptation model of the human visual system into equivalent tristimulus values for the viewing conditions associated with he intermediate color data metric. The use of the intermediate color data metric allows for reproduction of the color data on output devices, such as displays and printers, without having to compensate for each individual input device, medium, and viewing environment.

It is desirable that the intermediate color data metric be chosen so that it can be related to CIE XYZ tristimulus values, has sufficient gamut to describe all real-world colors of interest, can be efficiently encoded in a digital form, and is useful for color editing, tone scale processing, cut and paste operations, and color substitution.

Since all input color data are converted into intermediate color metric data and all outputs are derived from a common source metric and the system need not be concerned with the original data source. If the intent of the application is to accurately reproduce the input (within the capability of the output device and medium), then the steps are first conversion from the intermediate color metric into equivalent tristimulus values for the output viewing environment using a chromatic adaptation model, second, mapping out-of-gamut colors into in-gamut colors for the output device using an inverted analytical model of the output device's color response to determine the out of gamut colors and then using one of the well known gamut compression algorithms, such as clipping to the boundary, to bring the out-of-gamut colors to or within the device's gamut boundary, and third, converting the in-gamut tristimulus values into device colorant values again using an inverted analytical model of the output devices's color response.

Preview of the output on the system monitor can be accomplished by using the calculated output device colorant values in an analytical model of the device's response to predict tristimulus values relative to the output viewing conditions. These in turn can be converted into intermediate color data metric values by a chromatic adaptation model which accounts for the differences between the output viewing conditions and the viewing conditions associated with the intermediate color data metric. These values then can be transformed into equivalent tristimulus values for monitor viewing again by a chromatic adaptation model which accounts for the differences in the observers state of chromatic adaptation between the monitor viewing conditions and the viewing conditions associated with the intermediate color data metric. The equivalent monitor tristimulus values then may be transformed into monitor color signals through an inverse analytical model of the monitor response.

The present invention provides a method and means for characterizing the tristimulus response of color input and output devices and relating these responses to CIE colorimetric values. This is accomplished for input scanning devices by using color input targets whose CIE colorimetry has been determined through measurement and mathematical computations for the input viewing condition illuminant. The relationship between the scanner signals of the target and the CIE colorimetric values of the target are then mathematically modeled. These models then can be used to relate scanner signals from scanned objects of the same medium to colorimetric values.

A conceptually similar method and means is used for characterizing the color response for output devices such as system monitors and printers. A set of target input values is created for the output device that produces color patches of sufficient size for convenient measurement and are of sufficient extent to cover the full range of colors that the output device is capable of producing. These values are applied to the device and the CIE colorimetric values, for the specified output viewing conditions, are determined by measurement and mathematical computations. A mathematical model is then constructed relating the target input values to the computed CIE colorimetric values. An inverse model is also calculated that relates desired CIE colorimetric values to device drive values for in-gamut colors. This inverse model is used in the system output path for selection of actual device drive values for in-gamut colors.

As previously mentioned, FIG. 1 shows, in block diagram form, the color reproduction system 8 in accordance with a preferred embodiment of the invention. Color data inputs from hard copy scanners 10, optical disks 12, colorimetric specifications 14, video cameras 16, separations from pre-press systems and computer generated graphics from system monitors 20 all produce color encoding signals that are acceptable in the color reproduction system 8. These signals may be in the form of RGB signals, specifications such as XYZ or separations such as CMYK. A computer system 22, such as an Apple Macintosh system series computer, receives these signals and transforms them into a digital intermediate color metric or color space. The computer system 22 allows storage of the color information on a variety of storage devices, such as magnetic tape, disks, or optical disk media. The computer 22 also allows the transfer (sending or receiving) of color information to other systems through conventional communication means, such as a local area network or telephone lines. The computer 22 further allows the operator to modify the colors or compose new color objects from color data from a number of sources. A monitor 24 serves as a display for the color information and as a means for operator interaction with the color information through conventional control apparatus, such as a keyboard, mouse, or stylus. One or more output devices (in addition to the system monitor 24) are connected to the computer 22 either directly or by a network for the purpose of creating color hard copy using a printer 26, films using a film printer 28, or video. These output devices may be of any conventional technology such as ink-jet, film, electrophotography, or press. The computer 22 can also communicate with the output devices using color encoding signals RGB, colorimetric specifications 32 such as XYZ, or separations 30 like CMYK which are suitable for a plate type printer.

Figure 2:
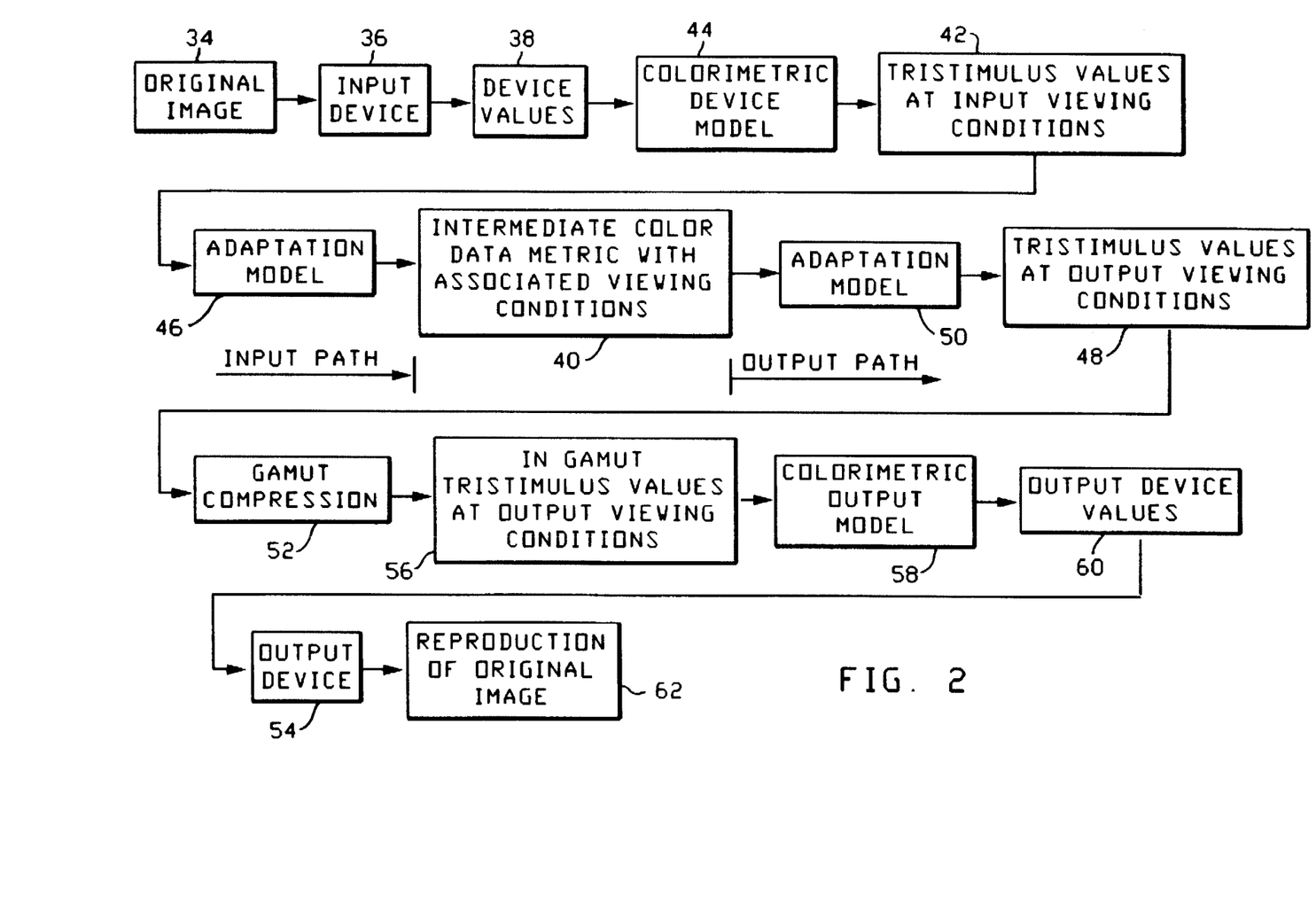
FIG. 2 illustrates an example set of transforms and color spaces in accordance with the present invention.

FIG. 2 illustrates the operations performed by the computer 22 in converting an original image 34 using a scanner 36 into input data 38, in an input device color space, to the independent intermediate color space 40 using specified reference viewing conditions and the conversion from the intermediate space to device drive values 60. To convert color inputs 38 from a device 36, such as a scanner, provided in scanner space into color signals in the independent space and then convert those color signals into device color output signals all based on the chromatic adaptation of the human observer to the same images presented on different devices/media under the input, output and reference viewing conditions requires several transforms. As an example, we will particularly discuss transforming inputs 38 from a scanner device 38 into the device-independent space 40 and then transforming the color signals from the device-independent space 40 into device signals 60 for a monitor output device 54. Those of ordinary skill could then substitute the particular device transform for other devices, such as a video camera input device and a printer output device.

In the input path, the inputs in the device dependent space 38 are first converted into device-independent signals in a device-independent space 42 by an input device transform or model 44 based on the input viewing conditions. The device-independent values 42, at the input viewing conditions, are then converted into device-independent values at the reference viewing conditions in the intermediate space 40 by an adaption transform 46. In the output path the color signals in the intermediate space 40 are converted into device-independent color signals in the device-independent space 48 at the output viewing conditions by an adaption transform 50. Gamut compression 52 is then performed to transform any color signals not representable by the output device 54 into device-independent signals at the output conditions in an independent space 56. The gamut compression 52 produces color signals that are within the reproduction range of the output device 54. These signals are transformed by a device model 58 into device output signals 60 which the output device 54 uses to reproduce the original image 62.

The following example of such a set of operations traces the calculation of monitor RGB signals from scanner RGB signals through a well-defined intermediate color space for an appearance match. The following example illustrates how the present invention can be used to account for chromatic adaptation differences of the human observer for an original reflection print viewed under one set of viewing conditions, scanned in a scanning device and viewed on a monitor under another set of viewing conditions after passing through an intermediate space with a specified set of viewing conditions. The example is described sequentially beginning with scanner RGB's.

For the purposes of this example the intermediate space 40 is CIE XYZ with the following standard viewing conditions or assumptions:

D5000 adaptation white point

X=96.43

Y=100

Z=82.51

Conversion from scanner RGB's to CIE XYZ's (42) at input viewing conditions is performed as follows. The input viewing conditions include Input adaptation white point

X=83.0

Y=86.23

Z=68.4

The particular scanner used in the example is the MRS-600ZS model scanner produced by Microtek. Using polynomials to model scanner colorimetric response:

$$X = 0.0062 + 0.47R_s + 0.042R_s^2 + 0.17G_sG_s +$$
$$0.18R_s^2G_s + 0.0074G_s^2 + 1.18R_sG_s^2 -$$
$$0.83R_s^2G_s^2 + 0.17R_sB_s + 0.45R_s^2B_s +$$
$$0.44G_sB_s - 2.41R_sG_sB_s + 0.18R_s^2G_sB_s +$$
$$1.63R_sG_s^2B_s - 0.32B_s^2 + 0.97R_sB_s^2 -$$
$$0.99R_s^2B_s^2 - 0.27G_s^2B_s^2 + 0.87R_sG_sB_s^2 -$$
$$1.08G_s^2B_s^2 - 0.13R_s^3 - 0.84G_s^3 + 2.10B_s^3$$

$$Y = 0.0083 + 0.14R_s^2 + 0.65G_s - 0.20R_sG_s -$$
$$0.29G_s^2 + 2.05R_sG_s^2 - 0.56R_s^2G_s^2 + 0.10B_s -$$
$$0.42R_sB_s + 0.94R_s^2B_s + 0.95G_sB_s -$$
$$3.92R_sG_sB_s + 1.75R_s^2G_sB_s + 2.62G_s^2B_s -$$
$$1.27R_sG_s^2B_s - 0.035B_s^2 + 1.51R_sB_s^2 -$$
$$2.25R_s^2B_s^2 - 1.56G_sB_s^2 + 3.16R_sG_sB_s^2 -$$
$$1.19G_s^2B_s^2 - 0.22R_s^3 - 1.08G_s^3 + 2.31B_s^3$$

-continued
$$Z = 0.0069 + 0.012R_s - 0.16R_s^2 - 0.05G_s -$$
$$0.26R_sG_s - 0.89R_s^2G_s + 0.0041G_s^2 +$$
$$1.55R_sG_s^2 + 0.34R_s^2G_s^2 + 0.84B_s -$$
$$0.20R_sB_s + 0.52R_s^2B_s - 0.036G_sB_s -$$
$$2.56R_sG_sB_s + 0.70R_s^2G_sB_s + 1.36G_s^2B_s +$$
$$0.61R_sG_s^2B_s - 0.069B_s^2 + 1.18R_sB_s^2 -$$
$$1.33R_s^2B_s^2 + 0.19G_sB_s^2 + 1.29R_sG_sB_s^2 -$$
$$1.38G_s^2B_s^2 + 0.33R_s^3 - 0.90G_s^3 -$$
$$0.27B_s^3$$

Using these polynomials the computer 22 determines the input CIE XYZ signals for each RGB signal produced by the scanner. These CIE XYZ signals are relative to the input viewing conditions.

Conversion from input CIE XYZ's (42) to intermediate CIE XYZ's (40) accounts for differences in a human observers state of chromatic adaptation for the input and reference viewing conditions. The example shows compensation for chromatic adaptation effects using the well-known von Kries model.

The von Kries model involves transforming the XYZ signals from the source into $\rho$, $\beta$, $\gamma$ (estimates of eye sensing channel responses), scaling these signals according to ratios of the $\rho$, $\beta$, $\gamma$ responses to the adaptation white points (scaling: destination/source) and then transforming the new rho', beta' and gamma' signals back to XYZ signals (now relative to the destination white point). For the transformation from input XYZ's to standard intermediate XYZ'S:
$(XYZ_{std})=(XYZ \text{ to } \rho,\gamma,\beta)^{-1}$ (scaler) $(XYZ \text{ to } \rho, \gamma,\beta)$ $(XYZ_{input})$ where $$(XYZ \text{ to } \rho,\gamma,\beta) = \begin{vmatrix} 0.3897 & 0.6890 & -0.0787 \\ -0.2298 & 1.1834 & 0.00464 \\ 0 & 0 & 1 \end{vmatrix}$$

and $$(\text{scaler}) = \begin{vmatrix} \rho std/\rho input & 0 & 0 \\ 0 & \gamma std/\gamma input & 0 \\ 0 & 0 & \beta std/\beta input \end{vmatrix}$$

where the $\rho,\gamma,62$ signals are calculated using the white point XYZ signals and the $(XYZ \text{ to } \rho,\gamma,\beta)$ matrix, and $$(XYZ \text{ to } \rho,\gamma,\beta)^{-1} = \begin{vmatrix} 1.9102 & -1.1122 & 0.2019 \\ 0.3709 & 0.6291 & 0 \\ 0 & 0 & 1 \end{vmatrix}$$

The conversions on the output side will now be discussed where the first conversion is from intermediate CIE XYZ's (40) to output CIE XYZ's (48). The output viewing conditions include:
9300K adaptation white point for monitor
X=85.99
Y=98.90
Z=130.08

The particular monitor which will be used as an example is the M0401 model produced by Apple. This conversion operation is the same as the above discussed conversion except with the standard XYZ's as the input and the monitor XYZ's as the output, i.e. $(XYZ_{output})=(XYZ \text{ to } \rho,\gamma,\beta)^{-1}$ (scalar) $(XYZ \text{ to } \rho, \Delta,\beta)$ $(XYZ_{std})$.

Once the conversion for chromatic adaptation has been performed the gamut compression 52 is performed. Output device models are defined for device signals to output CIE XYZ values at the output viewing conditions. The purpose of gamut compression is to map desired colors that are beyond the capability of the output device into in-gamut colors for the device. For purposes of this monitor example, the system clips all monitor RGB's to signals between 0 and 1 as the gamut compression algorithm. A person of ordinary skill in the art can create a process that determines whether a color signal is outside the 0–1 range and substitute the appropriate 0 or 1 values.

Once gamut compression is complete conversion to output device values (60) is performed by a CRT colorimetric model. The following model is typical of colorimetric CRT models:
(rgb linear CRT)=$(XYZ_{output}$ to $rgb_{linear\ CRT}$) $(XYZ_{output})$
where $$(XYZ_{out} \text{ to } rgb \text{ linear } CRT) = \begin{vmatrix} 0.0385 & -0.0158 & -0.0057 \\ -0.0091 & 0.0177 & 0.0002 \\ 0.0008 & -0.0023 & 0.0090 \end{vmatrix}$$

and the resulting $rgb_{linearCRT}$'s are limited to signals between 0 and 1.
The device signals are then . . .
$R_{CRT}=255$ $(1.01 \ (r_{linear\ CRT})^{0.5533}-0.0108)$
$G_{CRT}=255$ $(0.9614 \ (g_{linear\ CRT})^{0.7205}+0.0392)$
$B_{CRT}=255$ $(0.9639 \ (b_{linear\ CRT})^{0.6311}+1 \ 0.0360)$
where the CRT RGB's are limited to integer signals between 0 and 255. Although this description has been given for the transforms associated with scanners and monitors other transforms, such as for video cameras and printers, can be substituted.

It is of course possible for each set of input signals to be processed using the equations discussed above, however, this is time consuming. A preferred way of processing is to convert the equations into three-dimensional look up tables and the transform operations then become merely a look-up operation with a conventional tri-linear interpolation between the entries in the tables which can be performed in a domain other than the real number domain. It is also possible and preferred to compose or combine the look-up tables or transforms, such as 44 and 46, using known composition techniques. In some cases it is even preferred to convert the operations into one dimensional look-ups and sum operations.

Figure 3:
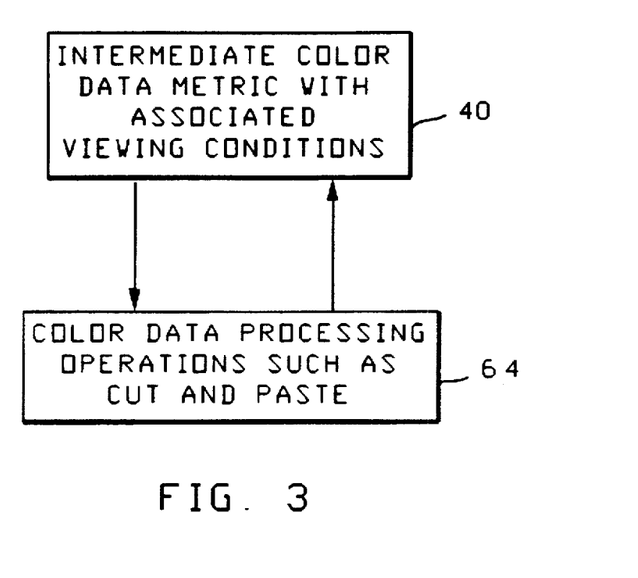
FIG. 3 illustrates modification of color for intent.

FIG. 3 illustrates a different data flow path that can be accommodated by the present invention. If the user wants to modify the entire image by, for example, sharpening the image or making adjustments for partial color blindness or cut and paste operations. A suitable, conventional operation 64 within the intermediate space 40 can be used.

Figure 4:
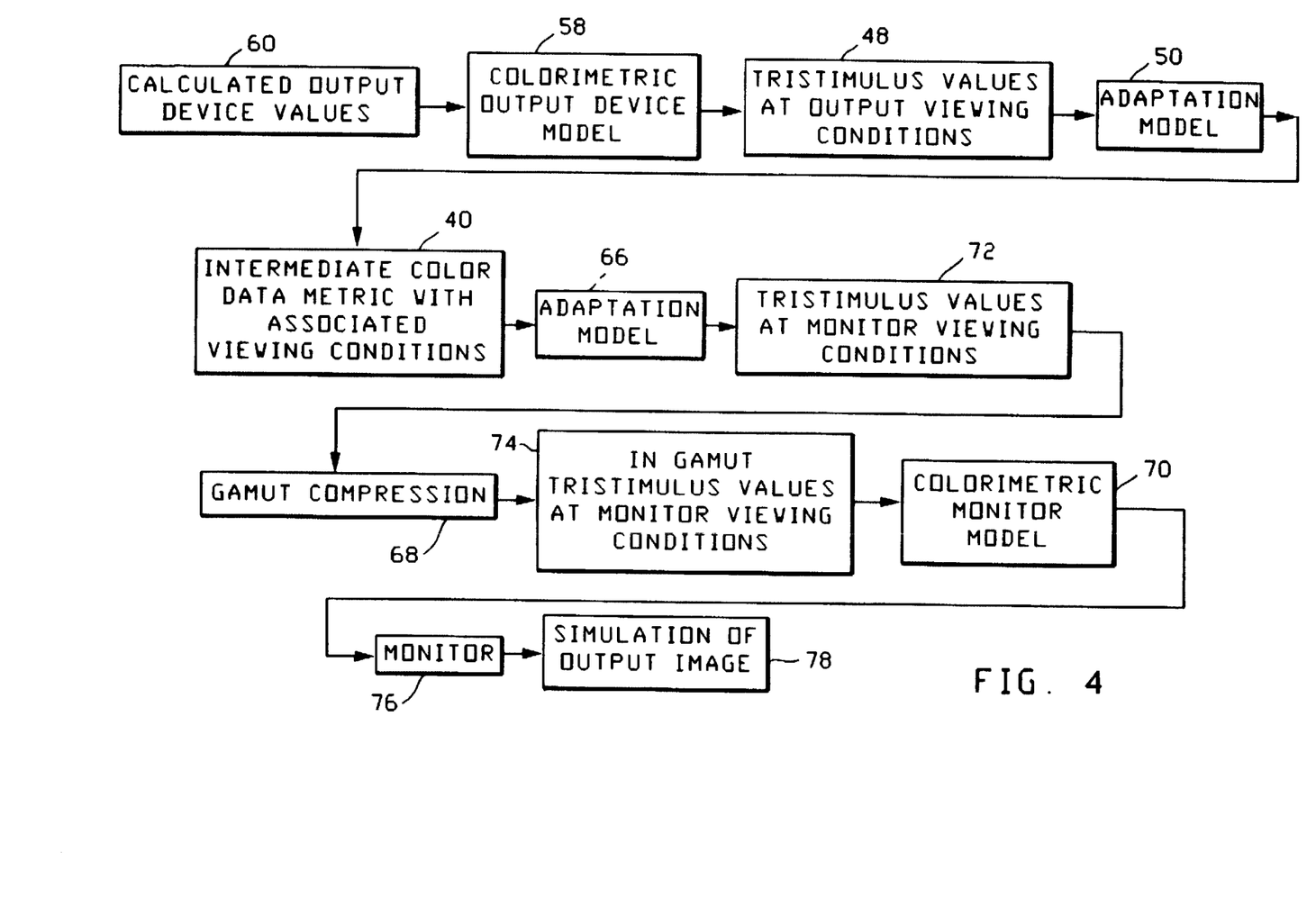
FIG. 4 illustrates the data flow for a preview.

It is also useful for the user to be able to see what the image will look like on a target device or media, such as a print produced by a printer 26, by previewing the image on a preview device, such as a monitor 24. In this situation, as illustrated in FIG. 4, the output device values 60 which have undergone the gamut compression for the printer output device 26 being simulated on the monitor 24 are passed back through device model 58 producing gamut compensated values at the output viewing conditions and then through the adaption transform 50 into the independent space 40, thereby reversing the adaption transform but leaving the color signals modified according to the target device characteristics. These modified device-independent color signals are then passed through the adaption 66, gamut 68 and device model 70 transforms and associated spaces 72 and 74 for the preview device and previewed showing the modifications which will occur when rendered using the target device.

Figure 5:
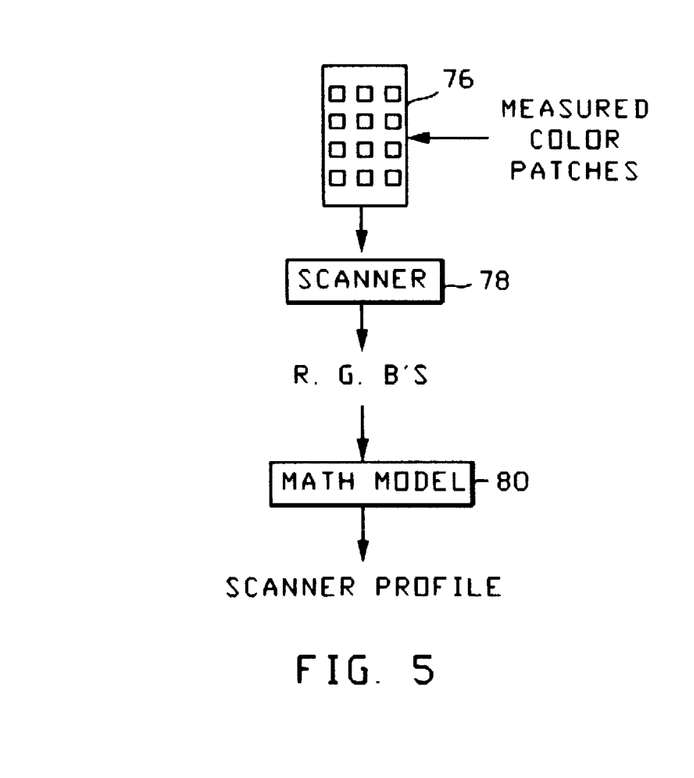
FIGS. 5 and 6 illustrate how input device models or transforms are created.
Figure 6:
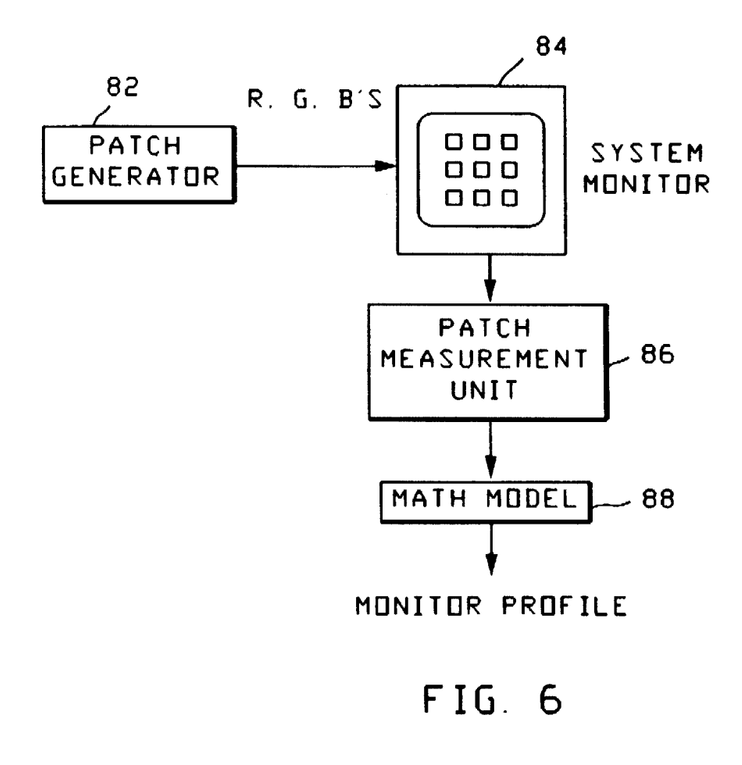

The input device colorimetric models or transforms can be obtained from the device manufacturer or can be measured as illustrated by FIGS. 5 and 6. As shown in FIG. 5, a target 76, with color patches thereon spanning the range of colors of interest, is scanned by a scanner 78 to be modeled and a mathematical relationship between the scanner signals for each patch and the colorimetric values for each target patch is determined. The colorimetric values are determined by measurement and calculation using the input viewing condition illuminant. The colorimetric values can be expressed as XYZ signals, CIELAB signals, or other color metrics that can be expressed as functions of XYZ. A mathematical model or transform 80 relating the target colorimetric values and scanner signals can be constructed using conventional polynomial curve fitting techniques or other data modeling techniques well known to those skilled in the art. Once the scanner signals for a particular input have been converted to colorimetric signals with this model, correction must be made for differences in observer chromatic adaptation corresponding to differences between the input viewing conditions and the digital intermediate color metric reference viewing conditions. The mathematical model by von Kries is suitable for this purpose. This correction completes the creation of the transform for the input device. For example, if the device is a scanner the scanner transforms 44 and 46 of FIG. 2 would be created. If the digital intermediate color metric standard viewing conditions are the same as those used by the scanner mathematical model, then the transform correction 46 is not needed. Once the scanner 78 visual response signals have been converted into equivalent signals in the digital intermediate color metric standard viewing conditions, then a color space (metric) conversion is done to the digital intermediate form (if the spaces(metrics) are different).

A similar path is followed for color information generated on a system monitor. FIG. 6 illustrates the method and means for modeling visual response to monitor signals. In this operation a patch generator 82 generates patch signals which are displayed on the monitor 84 and measured using a calibration or measurement unit 86. Models or transforms 88 are created as previously discussed. Again corrections for monitor viewing conditions and the digital intermediate color metric viewing conditions must be made.

Figure 7:
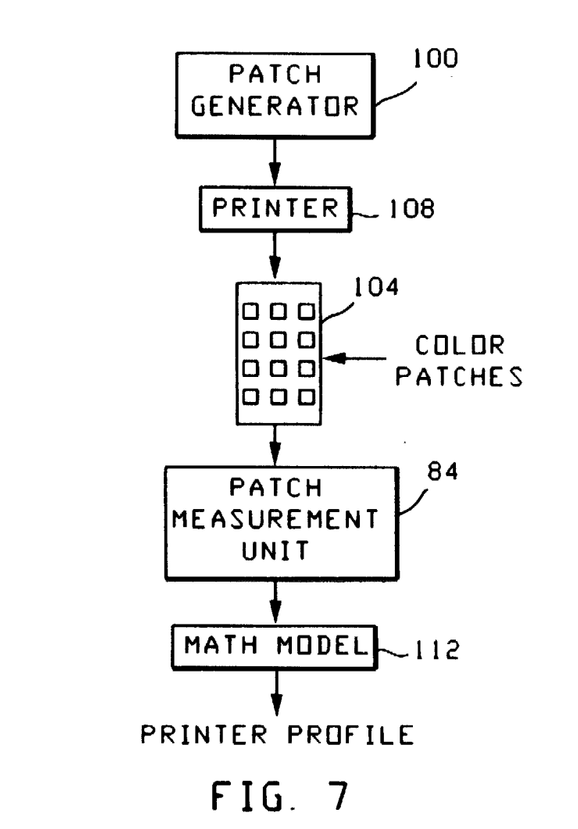
FIGS. 7 and 8 depict how output device models or transforms are created.
Figure 8:
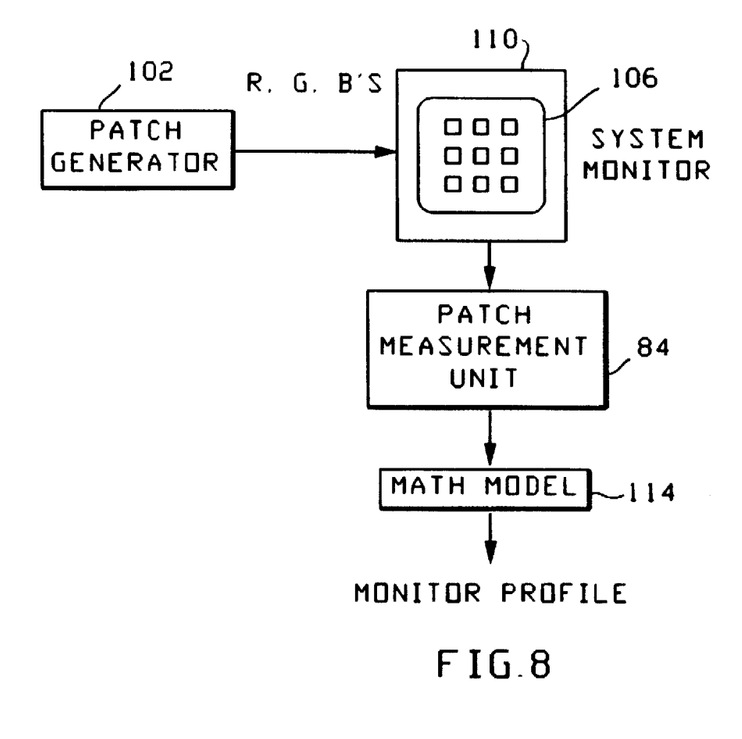

The present invention provides a system for characterizing the color response for output devices as well as input devices. FIGS. 7 and 8 illustrate the systems for developing mathematical models or transforms that can be used to define output device colorimetric response and transforms that can be used to select the proper device drive signals to achieve a certain device output colorimetric response. This approach can be used to characterize many types of output devices. The approaches for a printer (FIG. 7) and a monitor (FIG. 8) are shown. A color patch generator 100 or 102, usually a software application running on a digital computer is used to generate output samples of the color patches 104 or 106 either by driving the printer 108 or display 110 being characterized. These samples are then measured with a device 84, such as a spectrophotometer, and CIE colorimetric values are calculated using output viewing conditions appropriate for the application. These colorimetric values then can be related to the device drive signals through a mathematical model. Mathematical models or transforms 112 and 114 can be developed that define output colorimetric response from input device drive signals for the required input device drive signals to produce a desired output tristimulus response. These device characterizations then can be used to achieve the objects of the present invention.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:

first and second input devices producing color input signals in first and second input device spaces and having first and second predetermined viewing conditions; and a color management system coupled to said first and second input devices and having a device-independent color space with third predetermined viewing conditions different from the first and second viewing conditions, said management system including means for transforming the color input signals, from the first and second input device spaces into intermediate color signals in the device-independent color space, responsive to a human visual response to the first, second and different third predetermined viewing conditions.

2. An apparatus as recited in claim 1, wherein said human visual response comprises chromatic adaptations.

3. An apparatus, comprising:

first and second output devices producing images responsive to color output signals in first and second output device spaces and having first and second predetermined viewing conditions; and a color management system coupled to said first and second output devices and having a device-independent color space with third predetermined viewing conditions different from the first and second viewing conditions, said management system including means for transforming independent color space signals into device space output color signals responsive to a human visual response to the first, second and different third predetermined viewing conditions.

4. An apparatus as recited in claim 3, wherein said human visual response comprises chromatic adaptation.

5. An apparatus as recited in claim 3, wherein said output devices have output gamut characteristics and said system includes means for transforming responsive to the output gamut characteristics.

6. An apparatus, comprising:

an input device producing color input signals in an input device space for an input image viewed under first viewing conditions;

an output device producing an output image visually matching the input image under different second viewing conditions from color output signals in an output device space; and a color management system coupled to said input and output devices, transforming the color input signals into device-independent color signals in a device-independent space, having intermediate space viewing conditions, responsive to the first viewing conditions and the intermediate space viewing conditions, and transforming the device-independent color signals into the color output signals responsive to the intermediate space viewing conditions and the different second viewing conditions.

7. An apparatus as recited in claim 6, wherein said output device has output image gamut characteristics and said management system transforms the independent color signals into the color output signals responsive to the gamut characteristics.

* * * * *